United States Patent
Madenokouji et al.

(10) Patent No.: US 6,809,942 B2
(45) Date of Patent: Oct. 26, 2004

(54) SYSTEM INTERCONNECTION ELECTRIC POWER GENERATOR AND CONTROL METHOD THEREFOR

(75) Inventors: Masaki Madenokouji, Saitama (JP); Keigo Onizuka, Gunma (JP); Yasuhiro Makino, Saitama (JP); Masanori Kobayashi, Tochigi (JP)

(73) Assignee: Sanyo Electric Co., Ltd., Osaka (JP)

( * ) Notice: Subject to any disclaimer, the term of this patent is extended or adjusted under 35 U.S.C. 154(b) by 25 days.

(21) Appl. No.: 10/179,325

(22) Filed: Jun. 24, 2002

(65) Prior Publication Data

US 2003/0002310 A1 Jan. 2, 2003

(30) Foreign Application Priority Data

Jun. 29, 2001 (JP) ..................... P2001-197945
Jun. 29, 2001 (JP) ..................... P2001-197946
Jun. 29, 2001 (JP) ..................... P2001-197947

(51) Int. Cl.[7] ..................... H02M 3/24; H02M 7/5387
(52) U.S. Cl. ..................... 363/98; 363/132
(58) Field of Search ..................... 363/34, 37, 59, 363/60, 95, 97, 98, 131, 132; 307/46, 48, 49, 65, 66, 72–76, 80, 84–86; 361/42, 45, 49

(56) References Cited

U.S. PATENT DOCUMENTS 5,023,537 A   6/1991  Baits ..................... 318/732
6,104,624 A * 8/2000  Iwamoto et al. ............... 363/71
6,448,489 B2 * 9/2002  Kimura et al. ............... 136/244

FOREIGN PATENT DOCUMENTS

| EP | 0085249 A1 | 8/1983 | ............. H02J/5/00 |
| EP | 0810707 A2 | 12/1997 | ............. H02H/3/33 |
| EP | 1047179 A1 | 10/2000 | ............. H02M/7/48 |
| EP | 1107439 A2 | 6/2001 | ............. H02M/7/48 |
| EP | 1198056 A2 | 4/2002 | ............. H02M/1/10 |
| GB | 2 277 417 | 3/1994 | ............. G08B/19/00 |
| JP | 06332554 | 2/1994 | ............. G05F/1/67 |
| JP | 2002116830 | 4/2002 | ............. G05F/1/67 |

* cited by examiner

Primary Examiner—Matthew V. Nguyen
(74) Attorney, Agent, or Firm—Darby & Darby

(57) ABSTRACT

In a solar energy generator including a solar battery a microcomputer for controlling at least a boosting circuit and an inverter circuit so that AC power suitably usable as the AC power of a commercial power supply system can be supplied to the commercial power supply system, the power to be supplied to the various kinds of equipment of the solar energy generator is selectively supplied from one of the solar battery and the commercial power supply system. The microcomputer stores the operational status data of the solar energy generator into an external storage device, and these data can be used for maintenance or trouble shooting of the solar energy generator.

19 Claims, 4 Drawing Sheets

SYSTEM INTERCONNECTION ELECTRIC POWER GENERATOR AND CONTROL METHOD THEREFOR

BACKGROUND OF THE INVENTION

1. Field of the Invention

The present invention relates to a system interconnection electric power generator for enabling regeneration (supply) of electric power generated therein to a commercial power supply system which is interconnected to the electric power generator, and a method of controlling the system interconnection electric power generator.

2. Description of the Related Art

Recently, there has been recently becoming widespread a solar energy generator (photovoltaic generator) as a system interconnection electric power generator in which not only electric power generated by utilizing sunlight as an energy source is supplied for personal use, but also extra electric power thus generated (which has not been used for personal use) is regenerated (supplied) to a commercial power supply system.

In such a solar energy generator, DC power generated by using a solar battery is boosted by a boosting circuit and then the DC power thus boosted is converted to AC power corresponding to the AC power of a commercial power supply system by using an inverter circuit.

In such a solar energy generator as described above, the DC power generated by the solar battery is used as a power supply source for various kinds of equipment constituting the solar energy generator, such as a boosting circuit, an inverter circuit, a controller for controlling the boosting circuit and the inverter circuit, various types of detecting sensors, etc.

Further, according to the solar energy generator thus constructed, in order to enhance the safety of the solar energy generator thus constructed, a current sensor for detecting the earth fault of DC power supplied to various kinds of equipment is equipped to DC lines at the solar battery side. A current converter or the like is generally used as the current sensor, and it contains a magnetic member around which a coil is wound. The magnetic member of the current sensor is generally formed of expensive supersaturated reactor or the like.

In such a solar energy generator as described above, since electric power is generated by using sunlight, the amount of electric power to be generated by using a solar battery is reduced under such an atmosphere that the amount of insolation is low. For example, this is liable to occur at sunset or the like. Particularly in such a case that the electric power generated by the solar battery is partially supplied as a power supply source to various kinds of equipment constituting the solar energy generator, that is, a part of the electric power generated by the solar battery is consumed at these kinds of constituent equipment, the level of electric power to be supplied (regenerated) from the solar energy generator to the commercial power supply system is lower than a specified level required for the commercial power supply system at sunset or the like. Consequently, the supply of the electric power from the solar energy generator to the commercial power supply system must be stopped, that is, the operation of the solar energy generator itself must be stopped.

Therefore, the controller of the solar energy generator judges at all times whether the amount of electric power generated by the solar energy generator is lowered to the extent that it is impossible to use the electric power thus generated for the commercial power supply system at sunset or the like, that is, whether the electric power generated in the solar energy generator is lower than the specified power level or not, and stops the operation of the solar energy generator on the basis of the above judgment. In such a case that the amount of electric power generated in the solar energy generator is lower than the specified level, the electric power to be supplied from the solar energy generator to the various kinds of equipment (containing the controller) constituting the solar energy generator is also reduced, and thus the operation of these constituent equipment is unstable. Particularly when the electric power to be supplied to the controller (control power supply source) is lower, the controller cannot surely perform the judgment as to the reduction of the electric power (i.e., sunset or the like).

Furthermore, in such a solar energy generator as described above, the operational status of the solar energy generator under operation is merely displayed on a display panel or the like at that time point. Accordingly, in such a case that for example when some abnormality occurs in the commercial power supply system, the solar energy generator carries out a protecting operation of stopping supply of electric power therefrom to the commercial power supply under abnormality in order to protect the commercial power supply from being damaged or the like by further supply of the electric power to the commercial power supply, the data on the protecting operation of the solar energy generator are merely displayed on the display panel or the like at the time point when the abnormality occurs. That is, the data of the protecting operation which has been carried out until the abnormality is fixed do not remain.

Accordingly, after such a protecting operation is finished, even the fact that the protecting operation is carried out is not left. In this case, a service man(woman), a maintenance man(woman) or the like must take a countermeasure to the lack of the electric power to be supplied from the solar energy generator to the commercial power supply system while paying his/her attention to only the integration value of the amount of electric power generated by the solar energy generator. Therefore, it is substantially impossible to take a proper countermeasure to the lack of the electric power to be supplied from the solar energy generator to the commercial power supply system. That is, it has been hitherto impossible to determine the accurate cause for the lack of the electric power to be supplied from the solar energy generator to the commercial power supply system, and take the proper countermeasure thereto.

SUMMARY OF THE INVENTION

Therefore, the present invention has been implemented in view of the foregoing situation, and has a first object to provide a system interconnection electric power generator that can always secure electric power to be supplied to various kinds of equipment of the system interconnection electric power generator, such as control electric power to be supplied to a controller, until the operation of the system interconnection electric power generator is finished, and a method of controlling the system interconnection electric power generator.

A second object of the present invention is to provide a system interconnection electric power generator that can surely judge the operational status thereof and properly perform maintenance and troubleshooting, and a method of controlling the system interconnection electric power generator.

A third object of the present invention is to provide a system interconnection electric power generator that can detect the earth fault of direct current thereof at low cost and ensure high safety, and a DC earth fault detecting device used for the system interconnection electric power generator.

In order to attain the above objects, according to a first aspect of the present invention, a system interconnection electric power generator having various kinds of equipment for generating electric power and supplying the electric power to a commercial power supply system electrically-connected thereto, is characterized by comprising: an electric power generator for generating DC power; a boosting circuit for boosting the DC power generated in said electric power generator; an inverter circuit for converting the DC power boosted in said boosting circuit to AC power; a controller for controlling at least said boosting circuit and said inverter circuit; and a power source switching device that is controlled by said controller so as to select one of said electric power generator and the commercial power supply system as a power source for the power to be supplied to the various kinds of equipment of said system interconnection electric power generator.

In the system interconnection electric power generator, the AC power of the commercial power supply is rectified by the inverter circuit and then supplied to the various kinds of equipment of the system interconnection electric power generator.

In the system interconnection electric power generator, the electric power generator comprises a solar battery for generating the electric power corresponding to the amount of sunlight received.

In the system interconnection electric power generator, the power source switching device selects the electric power generator as the power source to supply the electric power generated by the electric power generator to the various kinds of equipment of the system interconnection electric power generator when the electric power generated by the electric power generator exceeds a predetermined level, and selects the commercial power supply system as the power source to supply the AC power of the commercial power supply system to the various kinds of equipment of the system interconnection electric generator when the electric power generated by the electric power generator is not more than the predetermined level.

In the system interconnection electric power generator, the controller intercepts the electrical connection between the various kinds of equipment of the system interconnection electric power generator and the commercial power supply system when the operation of the system interconnection electric power generator is finished.

According to a second aspect of the present invention, a system interconnection electric power generator having various kinds of equipment for generating electric power and supplying the electric power to a commercial power supply system electrically-connected thereto, is characterized by comprising: an electric power generator for generating DC power; a boosting circuit for boosting the DC power generated in the electric power generator; an inverter circuit for converting the DC power boosted in the boosting circuit to AC power; a controller for controlling at least the boosting circuit and the inverter circuit; and a power source switching device that is controlled by the controller so as to select one of the electric power generator and the commercial power supply system as a power source for the power to be supplied to the controller of the system interconnection electric power generator.

According to a third aspect of the present invention, a system interconnection electric power generator having various kinds of equipment for generating electric power and supplying the electric power to a commercial power supply system electrically-connected thereto, is characterized by comprising: an electric power generator for generating DC power; a boosting circuit for boosting the DC power generated in the electric power generator; an inverter circuit for converting the DC power boosted in the boosting circuit to AC power; a controller for controlling at least the boosting circuit and the inverter circuit; and a storage device that is controlled by the controller so as to store operational status data of the system interconnection electric power generator under operation.

In the system interconnection electric power generator, the operational status data are data on a protecting operation of protecting the system interconnection electric power generator or the commercial power supply system.

In the system interconnection electric power generator, the controller controls the storage device to store the operational status data of the system interconnection electric power generator under operation while keeping the power to be supplied to the controller just before the operation of the system interconnection electric power generator is finished.

In the system interconnection electric power generator, the electric power generator comprises a solar battery for generating the electric power corresponding to the amount of sunlight received.

In the system interconnection electric power generator, the controller controls the various kinds of equipment of the system interconnection electric power to keep the power to be supplied to the controller when the amount of insolation is reduced to a predetermined level or less, and stores the operational status data of the system interconnection electric power generator under operation into the storage device under the state that the power to be supplied to the controller is kept.

In the system interconnection electric generator, the controller makes a judgment as to sunset while keeping power required to the operation of said controller, and stops the supply of the power to the commercial power supply system when the judgment on sunset is affirmative.

According to a fourth aspect of the present invention, a method of controlling a system interconnection electric power generator comprising an electric power generator for generating DC power, a boosting circuit for boosting the DC power generated in the electric power generator, and an inverter circuit for converting the DC power boosted in the boosting circuit to AC power, the AC power thus boosted being supplied to a commercial power supply system, is characterized in that data representing an operational status of the system interconnection electric power generator under operation are stored in a storage device.

In the method, the operational status data is data on a protecting operation of protecting the system interconnection electric power generator or the commercial power supply system.

In the method, the operational status data of the system interconnection electric power generator under operation are stored in the storage device while keeping control power for a controller of the system interconnection electric power generator just before the operation of said system interconnection electric power generator is stopped.

In the method, the operational status data of the system interconnection electric power generator is stored in the storage device while keeping control power for a controller of the system interconnection electric power generator when the amount of insolation is reduce to a predetermined level or less.

In the method, a judgment on sunset is made under the state that control power for a controller of the system interconnection electric power generator is kept, and if the judgment on sunset is affirmative, the supply of the power to the commercial power supply system is stopped.

According to a fifth aspect of the present invention, a system interconnection electric power generator having various kinds of equipment for generating electric power and supplying the electric power to a commercial power supply system electrically-connected thereto, is characterized by comprising: an electric power generator for generating DC power; a boosting circuit for boosting the DC power generated in the electric power generator; an inverter circuit for converting the DC power boosted in the boosting circuit to AC power; a controller for controlling at least the boosting circuit and the inverter circuit; plural DC lines connected between the electric power generator and the boosting circuit so that direct current achieved in the electric power generator flows through the plural DC lines; and a DC earth fault detector for measuring the difference in current between the plural DC lines extending from the electric power generator to detect whether DC earth fault occurs or not in said system interconnection electric power generator, wherein the DC earth fault detector comprises a current sensor disposed on the plural DC lines, and the current sensor has a detecting core formed of a zero current transformer (ZCT).

In the system interconnection electric power generator, a magnetic member of the zero current transformer around which a coil is wound is formed of permalloy.

In the system interconnection electric power generator, the current sensor is disposed so that the DC lines penetrate through the detecting core of the current sensor, the detecting core is kept under an excited state so that the difference in flowing current between the DC lines can be measured, and it is judged on the basis of the output from the detecting core whether DC earth fault occurs in the DC lines.

In the system interconnection electric power generator, the electric power generator comprises a solar battery for generating the electric power corresponding to the amount of sunlight received.

According to a sixth aspect of the present invention, a DC earth fault detecting device is characterized by comprising: a current sensor disposed on plural measurement target conductors through which direct current flows; and a detector for measuring the difference in flowing current between the plural measurement target conductors and detects on the basis of the measurement result whether DC earth fault occurs in the plural measurement target conductors, wherein the current sensor having a detecting core formed of a zero current transformer (ZCT).

In the DC earth fault detecting device, the current sensor is disposed so that the DC lines penetrate through the detecting core of the current sensor, the detecting core is kept under an excited state so that the difference in flowing current between the DC lines can be measured, and it is judged on the basis of the output from the detecting core whether DC earth fault occurs in the DC lines.

DETAILED DESCRIPTION OF THE PREFERRED EMBODIMENTS

Preferred embodiments according to the present invention will be described hereunder with reference to the accompanying drawings.

Figure 1:
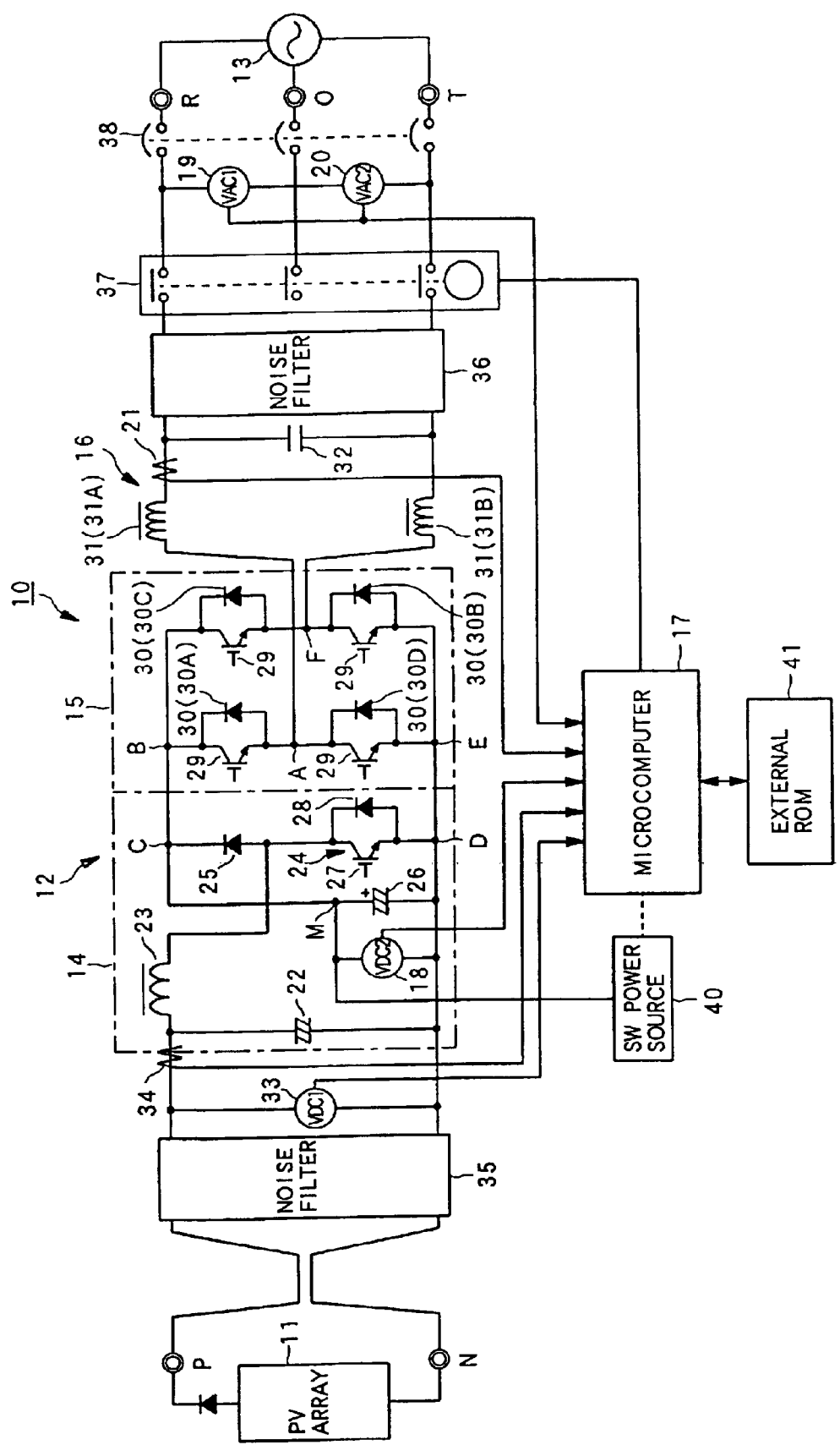
FIG. 1 is a circuit diagram showing a solar energy generator to which a first embodiment of a system interconnection electric power generator according to the present invention is applied, together with a commercial power supply system.

FIG. 1 is a circuit diagram showing a solar energy generator to which an embodiment of a system interconnection electric power generator according to the present invention, together with a commercial power supply system.

As shown in FIG. 1, the solar energy generator 10 as the system interconnection electric power generator is constructed to have a solar battery 11 (e.g., photovoltaic array) serving as electric generating means and a system interconnection electric power generator 12. The system interconnection electric power generator 12 is connected to single-phase three wires of a commercial power supply 13.

In the solar electric power generator 10, the system interconnection electric power generator 12 converts DC power generated from sunlight by the solar battery 11 to the AC power corresponding to the AC power of the commercial power supply system 13, and then supplies (regenerates) the AC power thus converted to the commercial power supply 13.

The solar battery 11 comprises many solar cells, and each of the solar cells 11 detects sunlight and generates DC power from the energy of the sunlight thus detected.

The system interconnection electric power generator 12 has a boosting circuit 14, an inverter circuit 15, a current smoothing circuit 16 and a microcomputer 17 serving as a controller. Further, the solar energy generator 10 is further equipped with various sensors such as an electrically-generated voltage detecting sensor 33, an electrically-generated current detecting sensor 34, a boosted voltage detecting sensor 18, a first system voltage detecting sensor 19, a second system voltage detecting sensor 20 and an inverter output current detecting sensor 21. These sensors are connected to the microcomputer 17 and outputs the detection results thereof to the microcomputer 17.

The solar battery 11 electrically generates unstable DC power and inputs the unstable DC power thus generated to the boosting circuit 14 through a noise filter 35. The boosting circuit 14 boosts the DC power thus input to achieve a voltage larger than the system voltage of the commercial power supply system 13, and it comprises a smoothing capacitor 22, a choke coil 23, a switching circuit 24, a diode 25 and a capacitor 26.

The smoothing capacitor 22 smoothes the DC power input to the choke coil 23 and the switching circuit 24. The switching circuit 24 comprises a switching element 27 and a diode 28. A power transistor, a power MOSFET, IGBT (Insulated Gate Bipolar Transistor) or the like is preferably used as the switching element 27.

By On/Off operation of the switching element 27, a boosted voltage is generated in the choke coil 23. Further, the capacitor 26 accumulates the high voltage power generated by the choke coil 23. The diode 25 prevents counter flow of the high voltage power accumulated in the capacitor 26.

The voltage boosted by the boosting circuit 14 is controlled by adjusting the time period (that is, ON duty) for which the switching element 27 is turned on. That is, when the system voltage of the commercial power supply system 13 is equal to 200V, the crest value (peak value) is equal to ±280V. Therefore, in order to regenerate the AC power from the system interconnection electric power generator 12 to the commercial power supply system 13, the boosted voltage of the boosting circuit 14 is required to be set to the absolute value of the peak value (280V) or more. Actually, the boosted voltage of the boosting circuit 14 is set to a value higher than 280V by 20 to 30V in consideration of the ON resistance of the switching element 29 (described later) of the inverter circuit 15 and the resistance of the reactor 31 of the current smoothing circuit 16.

The inverter circuit 15 comprises plural switching elements 29 which are bridged to one another, and switching elements 29 which are respectively provided in connection with the diodes 30 (fly-wheel), and it converts the DC power boosted in the boosting circuit 14 to the AC power corresponding to the AC power of the commercial power supply system 13, that is, the AC power of sinusoidal wave having the phase and frequency which are substantially coincident with the AC power of the commercial power supply system 13.

That is, the inverter circuit 15 conducts pulse-width modulation on the DC power input from the boosting circuit 14 by the on/off-operation of the switching element 29 so that the DC power is converted to the AC power. Further, the ON-operation time period (ON duty) of the switching element 29 is adjusted so that the waveform of the AC power (alternating current, alternating voltage) output from the inverter circuit 15 is coincident with the waveform of the alternating voltage of the system voltage in the commercial power supply system 13, whereby the phase and frequency of the AC power output from the inverter circuit 15 is substantially coincident with those of the system power of the commercial power supply system 13.

The current smoothing circuit 16 comprises a reactor 31 and a capacitor 32 as shown in FIG. 1, and it serves to smooth the current of the AC power converted by the inverter circuit 15. The AC power smoothed in the current smoothing circuit 16 is passed through a noise filter 36, a parallel-off conductor 37 and a protection relay 38 and then regenerated (supplied) to the commercial power supply system.

The parallel-off conductor 37 is connected to the microcomputer 17 to enable the solar energy generator 10 and the commercial power supply system 13 to be connected to or separated from each other. As described later, the microcomputer 17 outputs operating signals to the parallel-off conductor 37 so that the solar energy generator 10 and the commercial power supply system 13 are separated from each other when the operation of the solar energy generator 10 is finished and they are connected to each other when the operation of the solar energy generator 10 is started.

The electrically-generated voltage detecting sensor 33 is equipped with an isolation amplifier, and detects the voltage of the DC power which is generated by the solar battery 11 and input to the boosting circuit 14. Further, the electrically-generated current detecting sensor 34 is equipped with a current transformer, and detects the current of the DC power which is generated by the solar battery 11 and input to the boosting circuit 14.

The boosted voltage detecting sensor 18 is equipped with an isolation amplifier, and detects the boosted voltage which is boosted in the boosting circuit 14 and then output therefrom. Each of the first system voltage detecting sensor 19 and the second system voltage detecting sensor 20 is equipped with a transformer and detects the system voltage of the system power in the commercial power supply system 13. Further, the inverter output current detecting sensor 21 is equipped with a current transformer and detects the alternating current converted by the inverter circuit 15.

The microcomputer 17 monitors the DC power generated in the solar battery 11 by using the electrically-generated voltage detecting sensor 33 and the electrically-generated current detecting sensor 34, and turns on the parallel-off conductor to connect the solar energy generator 10 and the commercial power supply system 13 when the DC power is equal to a predetermined value or more, thereby starting the operation of the solar energy generator 10.

The microcomputer 17 adjusts the ON-duty of the switching element 27 of the boosting circuit 14 on the basis of the regenerated power to be regenerated (supplied) from the system interconnection generator 12 to the commercial power supply system 13, the system voltages detected by the first system voltage detecting sensor 19 and the second system voltage detecting sensor 20 and the boosted voltage detected by the boosted voltage detecting sensor 18 so that the boosted voltage achieved in the boosting circuit 14 is larger than the system voltage of the commercial power supply system 13.

Further, the microcomputer 17 adjusts the ON-duty of the switching element 29 of the inverter circuit 15 on the basis of the waveforms (sine waves) of the system voltage detected by the first system voltage detecting sensor 19 and the second system voltage detecting sensor 20 and the waveform of the output current detected by the inverter output current detecting sensor 21 to control the AC power (alternating current, alternating voltage) converted in the inverter circuit 15 so that the AC power has sinusoidal wave.

Under the control of the boosting circuit 14 and the inverter circuit 15 by the microcomputer 17, the AC power that is substantially coincident with the AC power of the commercial power supply system 13 can be regenerated (supplied) from the system interconnection electric power generator of the solar energy generator 10 to the commercial power supply system 13.

As shown in FIG. 1, the solar energy generator 10 of this embodiment is further equipped with a switching power source 40 and an external storage device 41. The switching power source 40 supplies stable DC power having little voltage variation to the microcomputer 17, the boosting circuit 14, the inverter circuit 15, and various kinds of sensors such as the first and second voltage detecting sensors 19 and 20, etc. Particularly, the power to be supplied to the microcomputer 17 will be hereinafter referred to as "control power". Further, EEPROM or the like is preferably used as the external storage device 41, and it is provided so that the communications can be made between the external storage device 41 and the microcomputer 17.

The switching power source 40 is connected to a point M in the neighborhood of the capacitor 26 of the boosting circuit 14 of the solar energy generator 10. The switching power source 40 selects the DC power generated by the solar battery 11, boosted by the boosting circuit 14 and then accumulated in the capacitor 26, or the DC power achieved by passing the AC power of the commercial power source system 13 through the parallel-off conductor 38 and the diodes 30 (fly-wheel diodes) of the inverter circuit so that the AC power is rectified, and then accumulating the DC power thus rectified into the capacitor 26 of the boosting circuit 14. Thereafter, the switching power source 40 stabilizes the DC power thus selected and then supplies it to the various kinds of equipment containing the microcomputer 17.

That is, when the voltage of the power that is electrically generated by the solar battery 11 exceeds a predetermined level, the switching power source 40 stabilizes the power that has been electrically-generated by the solar battery 11, boosted by the boosting circuit 14 and then accumulated in the capacitor 26, and supplies the power thus stabilized to the microcomputer 17, the boosting circuit 14, the inverter circuit 15, the various kinds of sensors, etc. Further, when the voltage of the power that is electrically generated by the solar battery 11 is equal to or less than the predetermined level (for example, at sunset), the switching power source 40 stabilizes the power achieved by rectifying the AC power of the commercial power supply system 13 with the diodes 30 of the inverter circuit 15 and then accumulating the power thus rectified in the capacitor 26 of the boosting circuit 14, and then supplies the power thus stabilized to the microcomputer 17, the boosting circuit 14, the inverter circuit 15, the various kinds of sensors, etc.

Here, the rectifying operation of the AC power of the commercial power supply system 13 by the diodes 30 of the inverter circuit 15 will be described while the plural diodes 30 of the inverter circuit 15 are discriminated from one another by using reference numerals 30A to 30D shown in FIG. 1 and the plural reactors 31 of the current smoothing circuit 16 are likewise discriminated from one another by using reference numerals 31A, 31B. That is, when the AC power of the commercial power supply system 13 successively flows through the reactor 31A, a point A, the diode 30A, a point B, a point C, the point M, the capacitor 26 of the boosting circuit 14, a point D, a point E, the diode 30B, a point F and the reactor 31B in this order, the diodes 30A and 30B rectify the AC power. On the other hand, when the AC power of the commercial power supply system 13 successively flows through the reactor 31B, the point F, the diode 30C, the point B, the point M, the capacitor 26, point D, the point E, the diode 30D, the point A and the reactor 31A in this order, the diodes 30C and 30D rectify the AC power.

As described above, the power to be supplied to the microcomputer 17, the boosting circuit 14, the inverter 15, the various kinds of sensors, etc. by the switching power source 40 is excellently secured at all times until the operation of the solar energy generator 10 is finished.

When the operation of the solar energy generator 10 is finished, the microcomputer 17 turns off the parallel-off conductor 37 to separate the various kinds of equipment of the solar energy generator 10 containing the microcomputer 17, the boosting circuit 14 and the inverter circuit 15 from the commercial power supply system 13. Therefore, the power to be supplied from the commercial power supply system 13 through the diodes 30 of the inverter circuit 15 and the capacitor 26 of the boosting circuit 14 to the switching power source 40 is vanished, so that the standby voltage of the microcomputer 17, the inverter circuit 15, the boosting circuit 14, the various kinds of sensors, etc. in the solar energy generator 10 is equal to zero.

Further, the microcomputer 17 is designed to store the operational status data of the solar energy generator 10 under operation in the external storage device 41 through communications with the external storage device 41. In this case, the operational status data contain, for example, data on a protection operation (the type of the protection operation and the protecting operation time) to protect the commercial power supply system 13 by preventing the power generated in the solar energy generator 10 from being regenerated (supplied) to the commercial power supply system 13 when some abnormality occurs in the commercial power supply system 13, data on a protection operation (the type of the protection operation and the protecting operation time) to protect the solar energy generator 10 itself when some abnormality occurs in the commercial power supply system or the solar energy system itself, the integration value of electric power generated by the solar energy generator 10, the type of the abnormality occurring in the solar energy generator 10, the occurring time of the abnormality, etc.

The recording operation of the operational status data into the external storage device 41 is carried out under the control of the microcomputer 17 by using the commercial power supply system 13, the diodes 30 of the inverter circuit 15, the capacitor 26 of the boosting circuit 14 and the switching power source 40 under the state that the control power to be supplied to the microcomputer 17 is secured, for example when the amount of isolation is reduced to a predetermined value or less. For example, the predetermined value corresponds to the isolation level required to generate the electric power corresponding to the electric power of the commercial power supply system, and such a situation may correspond to sunset or the like.

Further, the microcomputer 17 is designed so that it makes a judgment of the above isolation-amount reduction judgment (i.e., the judgment on the sunset or the like) under the state that the control power is secured at the sunset or the like.

According to the above embodiment of the present invention, the following effects (1) to (7) can be achieved.

(1) The control power to be supplied to the microcomputer 17 and the power to be supplied to the other kinds of equipment of the solar energy generator (the boosting circuit 14, the inverter circuit 15, the various kinds of sensors, etc.) are selectively secured from one of the solar battery 11 and the commercial power supply system 13. Therefore, when the power generated by the solar battery 11 is equal to or less than the predetermined level, the power is selectively supplied from the commercial power supply system 13 to the various kinds of equipment containing the microcomputer 17 of the solar energy generator 10 by using the inverter circuit 15, the diodes 30, the switching power source 40, etc. Accordingly, the control power to be supplied to the controller (microcomputer) and the power to be supplied to the other kinds of equipment of the solar energy generator 10 can be excellently secured at all times.

(2) The AC power of the commercial power supply system 13 is supplied to the various kinds of equipment of the solar energy generator 10 by using the diodes 30 of the inverter circuit 15, the switching power source 40, etc. Particularly, the AC power is partially supplied as the control power to the microcomputer 17, and thus the microcomputer 17 can secure the power required thereto even at sunset. Therefore, the judgment on the sunset can be surely performed.

(3) At the time when the operation of the solar energy generator is finished, the commercial power supply system 13 is electrically separated from the various kinds of equipment containing the microcomputer 17 of the solar energy generator 10 by the OFF-operation of the parallel-off conductor 37. Therefore, when the operation of the solar energy generator 10 is finished, the control power to be supplied to the microcomputer 17 and the power to be supplied to the various kinds of sensors are intercepted, so that the standby power of each kind of equipment of the solar energy generator 10 can be set to zero.

(4) When the operation of the solar energy generator 10 is finished, the various kinds of equipment containing the microcomputer 17 of the solar energy generator 10 are electrically separated from the commercial power supply system 13 by the OFF-operation of the parallel-off conductor 37. Therefore, there can be avoided such a situation that the various kinds of equipment of the solar energy generator 10 are broken due to lighting strike or the like.

(5) The operational status data of the solar energy generator 10 are stored in the external storage device 41 at all times. Therefore, for example after the operation of the solar energy generator 10 is finished, all the past operational status record can be surely judged on the basis of the operational status data stored in the external storage device 41. As a result, the maintenance of the solar energy generator 10 and the trouble shooting can be more properly performed.

(6) When the data on the protecting operation to protect the solar energy generator 10 itself or the commercial power supply system 13 are stored in the external storage device 41, the operational status data containing these protecting operation data are checked at the maintenance time or the like, whereby a proper countermeasure can be taken to such a situation that the integration value of the electricity generated by the solar energy generator 10 is smaller than an expected value due to occurrence of abnormality in the commercial power supply system 13 or the solar energy generator 10 itself or the like.

(7) The microcomputer 17 stores the operational status data of the solar energy generator 10 under operation into the external storage device 41 while the control power to be supplied to the microcomputer 17 can be secured by using the commercial power supply system 13, the diodes 30 of the inverter circuit 15, the switching power source 40, etc. Therefore, the communications between the microcomputer 17 and the external storage device 41 can be made under the state that the control power is stable, so that the storage operation of the operational status data into the external storage device 41 can be excellently performed at all times and the reliability of the data stored in the external storage device 41 can be enhanced.

Next, a solar energy generator to which a second embodiment of the system interconnection electric power generator according to the present invention is applied will be described with reference to FIGS. 2 to 4.

Figure 2:
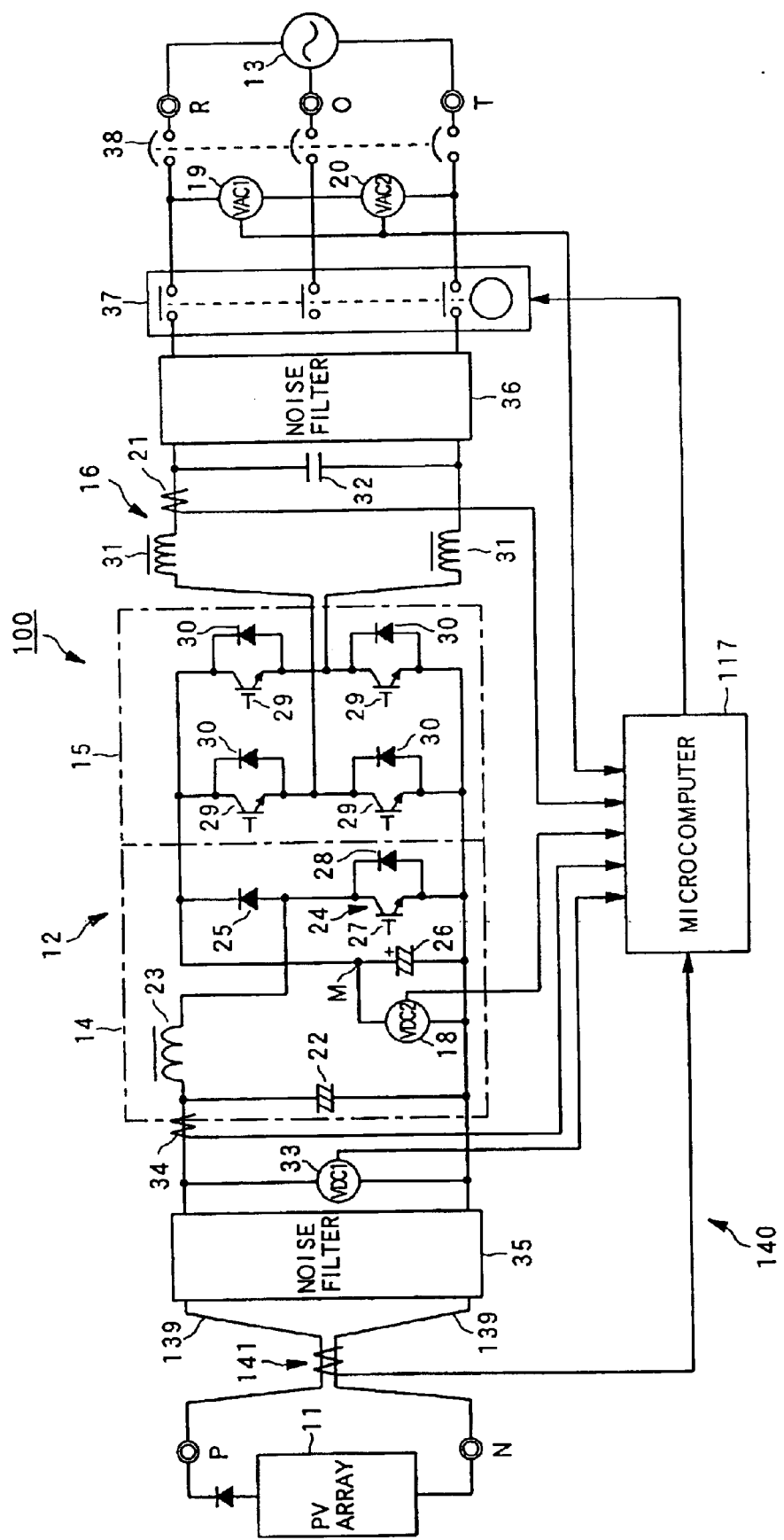
FIG. 2 is a circuit diagram showing a solar energy generator to which a second embodiment of a system interconnection electric power generator according to the present invention is applied, together with a commercial power supply system.

FIG. 2 is a circuit diagram showing the solar energy generator together with the commercial power supply system. The same constituent elements as those of FIG. 1 or the elements having the same functions as those of FIG. 1 are represented by the same reference numerals, and the description thereof is omitted from the following description. Further, the switching power supply system 40 and the external storage device (ROM) 41 shown in FIG. 1 are not shown in FIG. 1, however, these elements may be equipped to the second embodiment.

In the solar energy generator 100 to which the second embodiment is applied, a current sensor 141 of a direct current earth fault detecting device 140 (described later) is disposed on two DC lines 139 serving as measurement target conductive lines through which the solar battery 11 and the boosting circuit 14 are connected to each other and direct current flows from the solar battery 11 to the boosting circuit 14.

Figure 3:
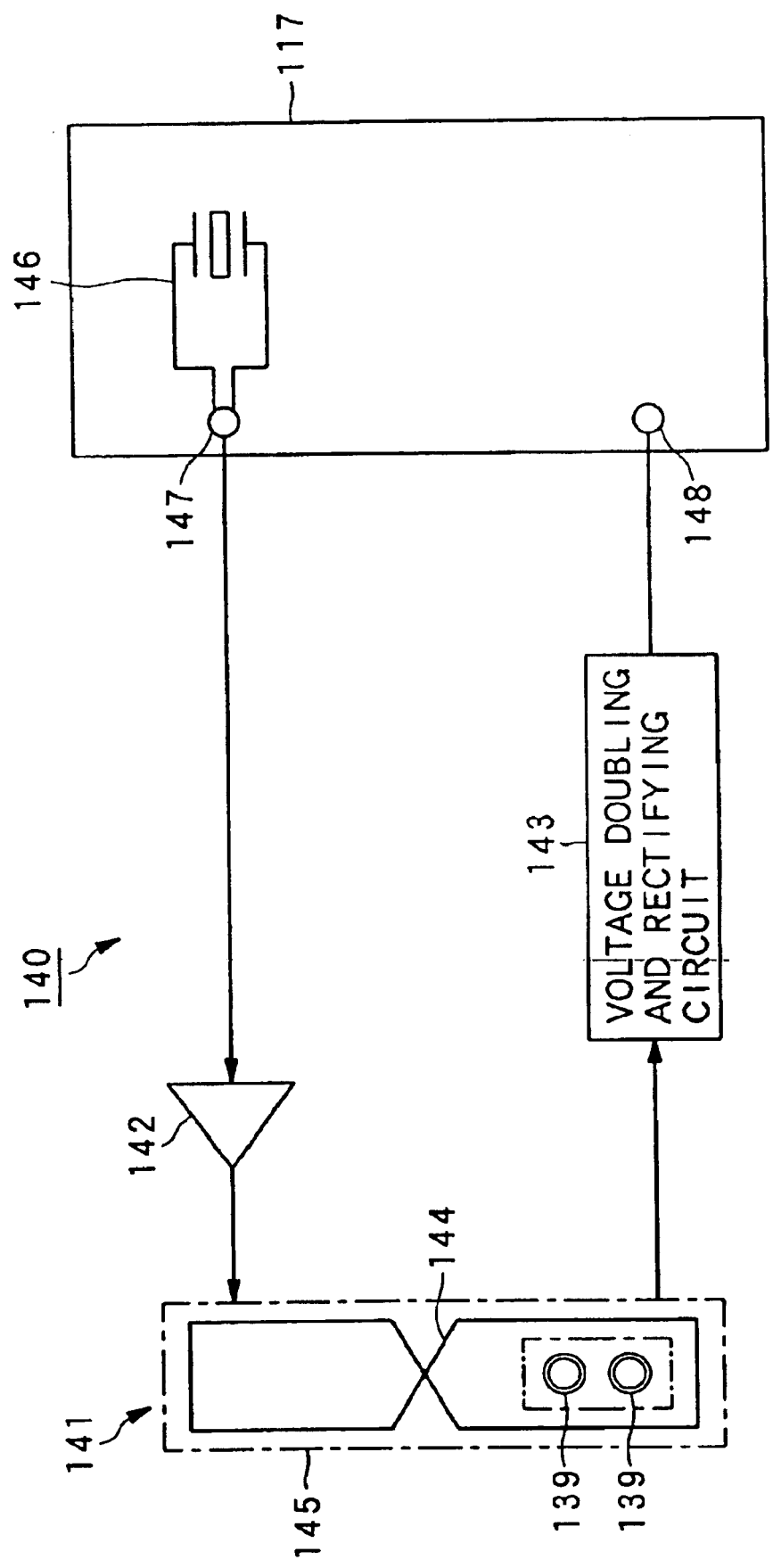
FIG. 3 is a block diagram showing a DC earth fault detecting device shown in FIG. 2.

As shown in FIG. 3, the DC earth fault detecting device 140 is constructed by the current sensor 141, an exciting amplifier 142, a voltage doubling and rectifying circuit 143 and the microcomputer 117, and it detects the DC earth fault at the side of the solar battery 11. The microcomputer 117 of this embodiment carries out the same control operation as the microcomputer 17 of FIG. 1, and particularly it is additionally designed to detect the earth fault of the direct current generated by the solar battery 11.

In the current sensor 141, a detecting core 144 through which the two DC lines 139 penetrate comprises ZCT (Zero Current Transformer), which is generally equipped to a general AC earth leakage breaker. ZCT has a magnetic member around which a coil is wound, and the magnetic member is formed of an inexpensive material such as permalloy or the like. Therefore, it is unnecessary to use expensive material for the current sensor, so that the manufacturing cost of the solar energy generator can be reduce. The detecting core 144 formed of ZCT as described above is mounted in a case 145 of the solar battery 11.

The microcomputer 117 contains an oscillator 146. When the microcomputer 117 outputs a pulse-waveform voltage of ±2.5V from a PWM port 147 (PWM: Pulse Width Modulation) to the exciting amplifier 142 on the basis of a signal from the oscillator 146, the exciting amplifier 142 sets the detecting core 144 of the current sensor to an excited state.

Under the excited state, the detecting core 144 measures the difference between the current values flowing through the two DC lines 139, and outputs the output current (AC) corresponding to the difference thus measured to the voltage doubling and rectifying circuit 143. That is, when no earth fault occurs in the DC lines 139, there occurs no difference between the current values of the two DC lines 139, and thus the output current from the detecting core 144 is equal to zero because the positive and negative current values caused by the respective DC lines 139 are symmetrical with each other, that is, they are offset to each other. On the other hand, when earth fault occurs in the DC lines 139, the difference corresponding to the degree of the earth fault occurs between the DC lines 139, and thus the output current from the detecting core 144 is shifted to the positive or negative side, so that positive/negative asymmetrical current is output from the detecting core 144.

The positive or negative current is output from the detecting core 144 to the voltage doubling and rectifying circuit 143, and the voltage doubling and rectifying circuit 143 rectifies the output current (alternating current) output from the detecting core 144 of the current sensor 141 to direct current. The voltage doubling and rectifying circuit 143 transforms the voltage output from the detecting core 144 to a voltage having amplitude which is double or more times as high as the voltage output from the detecting core 144, and then output the voltage to the A/D port 148 (A/D: Analogue to Digital) of the microcomputer 117.

On the basis of the voltage value input to the A/D port 148, the microcomputer 117 detects whether earth fault occurs in the DC lines 139. FIG. 4 shows the relationship between the input voltage V input to the A/D port 148 and the absolute value of the output current I from the detecting core 144 when various kinds of ZCTs ($ZCT_1$, $ZCT_2$, $ZCT_3$) are used.

Figure 4:
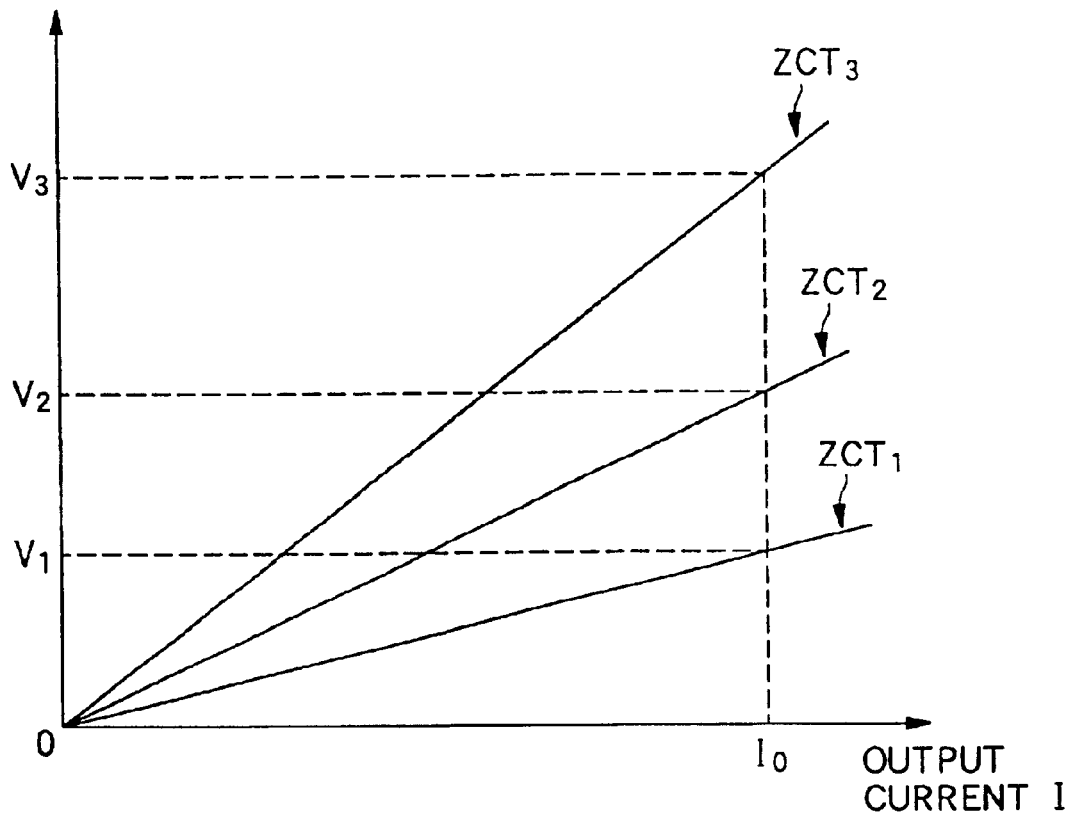
FIG. 4 is a graph showing the relationship between the output current I output from the detection core of a current sensor and the input voltage V input to a microcomputer.

In FIG. 4, it is assumed that earth fault occurs when the absolute value of the output current I from the detecting core 144 is equal to $I_0$ (for example, 100 mA) or more. When an input voltage that is not less than the voltage corresponding to $I_0$ (i.e., $V_1$, $V_2$, $V_3$) is input to the A/D port 148, the microcomputer 117 judges that earth fault occurs in the DC lines 139, and detects the DC earth fault. The voltages $V_1$, $V_2$, $V_3$ are threshold voltages for the judgment on occurrence of DC earth fault when each of $ZCT_1$, $ZCT_2$, $ZCT_3$ is used, and these voltages are measured in advance and stored in the external storage device in advance.

When the operation of the solar energy generator 100 is stopped, no current flows from the solar battery 11 to the DC lines 139, and thus the output current from the detecting core 144 of the current sensor 141 is equal to zero. When the output current from the detecting core 144 is not equal to zero and this a voltage applied to the A/D port 148 although the operation of the solar energy generator 100 is stopped, the microcomputer 117 judges that some trouble occurs in the current sensor 141, and outputs an alarm or the like.

According to this embodiment, the detecting core 144 of the current sensor 141 for measuring the difference between the currents flowing through the DC lines 139 connected to the solar battery 11 is constructed by inexpensive ZCT (Zero Current Transformer) equipped to a general AC leakage breaker. Therefore, the current sensor 141 can be manufactured at low cost, and high safety can be kept in the solar energy generator 100 by the DC earth-fault detection using the current sensor 141.

The present invention is not limited to the above-described embodiments, and various modifications may be made to the above embodiments.

For example, in the above-described embodiments, the electrical generating means is the solar battery 11, and the system interconnection electric power generator is the solar energy generator 10 (100). However, the present invention may be applied to another system interconnection electric power generator in which electric power is regenerated (supplied) to the commercial power supply system by using another electric generating means such as a window power generator or the like.

In the above-described embodiments, the DC earth fault detecting device 140 is applied to the solar energy generator 100, however it may be applied particularly to a fuel battery for generating high voltage or the like.

Further, the storage of the operational status data of the solar energy generator into the external storage device by the microcomputer 17 is carried out, not only just before the operation of the solar energy generator 100 is finished (for example, at sunset), but also when an operational status to be stored occurs under the operation of the solar energy generator 100.

As described above, according to the system interconnection electric power generator of the present invention and the control method therefor, the power to be supplied to the various kinds of the system interconnection electric power generator can be excellently secured at all times until the operation of the system interconnection electric power generator is finished. Particularly, the control power to be supplied to the controller (microcomputer) can be excellently secured, so that the judgment processing of the controller as to sunset or the like can be surely performed.

Further, according to the system interconnection electric power generator of the present invention and the control method therefor, the present and past operational status records of the system interconnection electric power generator can be surely recognized, and thus the maintenance and the trouble shooting of the solar energy generator can be properly performed by using these records.

Still further, according to the DC earth fault detecting device, the earth fault of direct current can be detected at low cost, and high safety can be kept.

Still further, according to the system interconnection electric power generator, the earth fault of the direct current can be detected at low cost and high safety can be kept by using the DC earth detecting device equipped in the system interconnection electric power generator.

What is claimed is:

1. A method of controlling a system interconnection electric power generator comprising an electric power generator for generating DC power, a boosting circuit for boosting the DC power generated in the electric power generator, and an inverter circuit for converting the DC power boosted in the boosting circuit to AC power, the AC power thus boosted being supplied to a commercial power supply system, characterized in that data representing an operational status of the system interconnection electric power generator under operation are stored in a storage device.

2. The method as claimed in claim 1, wherein the operational status data is data on a protecting operation of protecting the system interconnection electric power generator or the commercial power supply system.

3. The method as claimed in claim 1, wherein the operational status data of the system interconnection electric power generator under operation are stored in the storage device while keeping control power for a controller of the system interconnection electric power generator just before the operation of said system interconnection electric power generator is stopped.

4. The method as claimed in claim 1, wherein the operational status data of said system interconnection electric power generator is stored in the storage device while keeping control power for a controller of the system interconnection electric power generator when the amount of insolation is reduce to a predetermined level or less.

5. The method as claimed in claim 1, wherein a judgment on sunset is made under the state that control power for a controller of the system interconnection electric power generator is kept, and if the judgment on sunset is affirmative, the supply of the power to the commercial power supply system is stopped.

6. A system interconnection electric power generator having various kinds of equipment for generating electric power and supplying the electric power to a commercial power supply system electrically-connected thereto, comprising an electric power generator for generating DC power;
a boosting circuit for boosting the DC power generated in said electric power generator;
an inverter circuit for converting the DC power boosted in said boosting circuit to AC power;
a controller for controlling at least said boosting circuit and said inverter circuit; plural DC lines connected between said electric power generator and said boosting circuit so that direct current achieved in said electric power generator flows through said plural DC lines; and a DC earth fault detector for measuring the difference in current between said plural DC lines extending from said electric power generator to detect whether DC earth fault occurs or not in said system interconnection electric power generator, wherein said DC earth fault detector comprises a current sensor disposed on said plural DC lines, and said current sensor has a detecting core formed of a zero current transformer (ZCT).

7. The system interconnection electric power generator as claimed in claim 6, wherein a magnetic member of said zero current transformer around which a coil is wound is formed of permalloy.

8. The system interconnection electric power generator as claimed in claim 6, wherein said current sensor is disposed so that said DC lines penetrate through said detecting core of said current sensor, said detecting core is kept under an excited state so that the difference in flowing current between said DC lines can be measured, and it is judged on the basis of the output from said detecting core whether DC earth fault occurs in said DC lines.

9. The system interconnection electric power generator as claimed in claim 6, wherein said electric power generator comprises a solar battery for generating the electric power corresponding to the amount of sunlight received.

10. A system interconnection electric power generator having an electric power generator (11) for generating DC power, a boosting circuit (14) for boosting the DC power supplied from the electric power generator (11) to a predetermined voltage larger than the system voltage of a commercial power line, said boosting circuit (14) being equipped with a capacitor (26) for charging DC power, an inverter circuit (15) for converting the boosted DC power to AC power and supplying the AC power thus converted through said commercial power line to a commercial power supply system (13), and a microcomputer (17) for controlling the boosting circuit (14) and the inverter circuit (15), characterized by further comprising:

a switched power source that is connected between said boosting circuit (14) and said microcomputer (17) and directly supplied with the DC power charged in said capacitor (26) from said boosting circuit (14) so as to supply regulated DC power to said microcomputer (17) irrespective of variation of the DC power generated by said electric power generator (11), wherein said inverter circuit has at least four arms each having a switching element and a fly-wheel diode, and said capacitor (26) charges the DC power generated by said electric power generator (11) and then boosted by said boosting circuit (14) or DC power achieved by passing AC power from the commercial power line through said flywheel diodes (30) of said inverter circuit (15) to rectify the AC power.

11. The system interconnection electric power generator according to claim 10, wherein the DC power supplied from said switched power source to said microcomputer corresponds to DC power achieved by boosting and stabilizing the DC power generated in said electric power generated if the DC power generated by said electric power is more than a predetermined threshold value, or to DC power achieved by rectifying and stabilizing AC power from the commercial power line if the DC power generated by said electric power is not more than the predetermined threshold value.

12. The system interconnection electric power generator as claimed in claim 11, wherein the AC power from the commercial power line is rectified by said fly-wheel diodes of said inverter and then supplied through said boosting circuit to said switched power source.

13. The system interconnection electric power generator as claimed in claim 10, wherein said electric power generator comprises a solar battery for generating the electric power corresponding to the amount of sunlight received.

14. The system interconnection electric power generator as claimed in claim 10, wherein said microcomputer intercepts the electric connection between power source and the commercial power line when the operation of said system interconnection electric power generator is finish.

15. The system interconnection electric power generator as claimed in claim 10, further comprising:

a storage device that is controlled by said microcomputer so as to store operation status data of said system interconnection electric power generator under operation.

16. The system interconnection electric power generator as claimed in claim 15, wherein the operational status data are data on a protecting operation of protecting said system interconnection electric power generator or the commercial power supply system.

17. The system interconnection electric power generator as claimed in claim 15, wherein said controller controls said storage device to store the operational status data of said system interconnection electric power generator under operation while keeping the power to be supplied to said controller just before the operation of said system interconnection electric power generator is finished.

18. The system interconnection electric power generator as claimed in claim 15, wherein said electric power generator comprises a solar battery for generating the electric power corresponding to the amount of sunlight received.

19. The system interconnection electric generator as claimed in claim 14, wherein said microcomputer makes a judgment as to sunset, and stops the power supply to said commercial power line when the judgment on sunset is confirmed.

* * * * *